United States Patent
Baun et al.

(10) Patent No.: US 10,914,289 B2
(45) Date of Patent: Feb. 9, 2021

(54) AIRBORNE WIND ENERGY SYSTEM

(71) Applicant: Vestas Wind Systems A/S, Aarhus N. (DK)

(72) Inventors: Torben Ladegaard Baun, Skødstrup (DK); Peter Lindholst, Hinnerup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/609,597

(22) PCT Filed: May 4, 2018

(86) PCT No.: PCT/DK2018/050095
§ 371 (c)(1),
(2) Date: Oct. 30, 2019

(87) PCT Pub. No.: WO2018/215035
PCT Pub. Date: Nov. 29, 2018

(65) Prior Publication Data
US 2020/0116130 A1    Apr. 16, 2020

(30) Foreign Application Priority Data

May 24, 2017 (DK) .................. 2017 70379

(51) Int. Cl.
*F03D 13/10* (2016.01)
*F03D 9/25* (2016.01)
(Continued)

(52) U.S. Cl.
CPC .............. *F03D 13/10* (2016.05); *F03D 7/00* (2013.01); *F03D 9/255* (2017.02); *H02K 7/1838* (2013.01); *H02K 7/20* (2013.01); *H02K 15/0006* (2013.01)

(58) Field of Classification Search
CPC ............ F03D 13/10; F03D 9/255; F03D 7/00; H02K 7/1838; H02K 7/20; H02K 15/0006
See application file for complete search history.

(56) References Cited

U.S. PATENT DOCUMENTS

| 2007/0126241 A1* | 6/2007 | Olson ...................... F03D 5/06 290/55 |
| 2008/0296905 A1* | 12/2008 | Ferguson .................. F03D 9/25 290/55 |

(Continued)

FOREIGN PATENT DOCUMENTS

| CN | 103670925 A | 3/2014 |
| CN | 104061125 A | 9/2014 |

(Continued)

OTHER PUBLICATIONS

China National Intellectual Property Administration, First Notification of Office Action in CN Application No. 201880033990.5, dated Aug. 4, 2020.

(Continued)

*Primary Examiner* — Viet P Nguyen
(74) *Attorney, Agent, or Firm* — Wood Herron & Evans LLP

(57) ABSTRACT

The invention relates to a method for dismantling a wind turbine and erecting a wind energy generating system, wherein the wind turbine comprises a tower placed on a foundation on a wind turbine site and a nacelle with a rotor mounted on the tower. The method comprises the steps of removing the rotor from the wind turbine, mounting an airborne wind energy system for generating electrical power on a part of the remaining wind turbine via a cable, and electrically connecting the airborne wind energy system to a power grid via a power transmission line.

20 Claims, 8 Drawing Sheets

(51) Int. Cl.
  *F03D 7/00* (2006.01)
  *H02K 7/18* (2006.01)
  *H02K 7/20* (2006.01)
  *H02K 15/00* (2006.01)

(56) References Cited

U.S. PATENT DOCUMENTS

2014/0062094 A1  3/2014  Chan
2015/0184629 A1  7/2015  Vander Lind
2017/0121036 A1* 5/2017  Hachtmann ............... F03D 9/32

FOREIGN PATENT DOCUMENTS

| CN | 109424506 A | 3/2019 |
| DE | 2839918 A1 | 3/1980 |
| IT | UB20159172 A1 | 3/2016 |
| KR | 20140127542 A | 11/2014 |
| WO | 2017008818 A1 | 1/2017 |

OTHER PUBLICATIONS

Danish Patent and Trademark Office, Search and Exam Report in PA 2017 70379, dated Nov. 8, 2017.
European Patent Office, International Search Report and Written Opinion in PCT Application No. PCT/DK2018/050095, dated Jul. 25, 2018.
Antonello Cherubini et al., Airborne Wind Energy Systems: A review of the technologies, Renewable and Sustainable Energy Reviews, 51 (2015) 1461-1476.
European Patent Office, Examination Report in EP Application No. 18724126.0, dated Nov. 12, 2020.

* cited by examiner

AIRBORNE WIND ENERGY SYSTEM

FIELD OF THE INVENTION

The present invention relates to a method for dismantling a wind turbine and erecting a wind energy generating system comprising an airborne wind energy system. The invention further relates to an airborne wind energy system.

BACKGROUND OF THE INVENTION

Modern wind turbines are used for generating electrical energy for a power grid. To this end, a set of wind turbine blades coupled to a rotor are directed into the incoming wind, and the energy of the wind is extracted by the wind turbine blades and causes the rotor to rotate, thereby converting the energy of the wind into mechanical energy. The rotor is connected to a generator, either directly or via a gear arrangement, and thereby the mechanical energy of the rotating rotor is converted into electrical energy. The electrical energy is supplied to a power grid, via suitable components.

Over the years, the size and dimensions of the wind turbines have generally increased in order to increase the amount of energy extracted from the wind and the annual power output. With the significantly longer blades and larger generators follow correspondingly higher wind turbine towers, larger and significantly heavier nacelles and larger bearings etc. The tower and foundation thereby naturally need to be dimensioned to carry the larger loads and vibrations caused by the wind acting on the larger and heavier system.

In general, it is therefore not possible to simply update or upgrade an existing wind turbine to a version with a higher power output without most likely having to exchange the foundation and the tower and possibly also the power lines, which then essentially amounts to erecting a completely new wind turbine. Existing wind turbines are therefore in general maintained by repair to the amount possible and for as long as profitable and then eventually taken out of service. Often, non-producing wind turbines are left on the site because of the costs of dismantling and disposing of the wind turbine.

Other wind energy generating systems than wind turbines are known such as various airborne wind energy systems, being capable of capturing wind energy at a higher altitude than traditional wind turbines. Common to these systems is that a part of the system is launched to a high altitude, where energy of the wind is harvested. The harvested energy is transferred to a ground station, either in the form of mechanical energy or in the form of electrical energy. In the case that the transferred energy is in the form of mechanical energy, a generator will normally be arranged at the ground station in order to convert the mechanical energy into electrical energy. In the case that the transferred energy is in the form of electrical energy, the airborne wind energy system comprises an airborne generator, i.e. the part of the system which is launched to a high altitude includes a generator. The part of the airborne wind energy system being launched to a high altitude may, e.g., include a kite or a glider.

Airborne wind energy systems are normally launched from an attachment position on the ground, requiring a separate foundation and cable having a sufficient length to allow the airborne wind energy system to be launched to the desired high altitude.

A number of airborne wind energy systems are described in Cherubini, et al., 'Airborne Wind Energy Systems: A review of the technologies', Renewable and Sustainable Energy Reviews, 51 (2015) 1461-1476.

US 2007/0126241 discloses a wind driven apparatus for an aerial power generation system including driven elements and controls. The driven elements are configured and shaped to provide maximum force from both lift and drag during the downwind phase of operation and minimum force during the upwind phase. The driven elements have a sail portion with a leading edge and a trailing edge. The controls change the driven elements between high force configurations for downwind operation and low force configurations for upwind operation, adjust the pitch and azimuth angles of the driven elements, and control the camber. In one embodiment, the driven elements are attached to a shaft being rotatably mounted on a nacelle on top of a tower.

DESCRIPTION OF THE INVENTION

It is an object of embodiments of the invention to provide a method for erecting a wind energy generating system which reuses a number of components from a previous wind turbine and/or wind turbine site.

It is a further object of embodiments of the invention to provide a fast and simple method of establishing an airborne wind energy system coupled to the electrical grid and at relatively low costs.

It is a further object of embodiments of the invention to provide an airborne wind energy system which can be launched to a high altitude without requiring a correspondingly long cable.

According to a first aspect the present invention provides for a method of dismantling a wind turbine and erecting a wind energy generating system, the wind turbine comprising a tower placed on a foundation on a wind turbine site and a nacelle with a rotor mounted on the tower, the method comprising the steps of:

removing at least the rotor from the wind turbine, mounting an airborne wind energy system for generating electrical power on a part of the wind turbine via a cable; and electrically connecting the airborne wind energy system to a power grid via a power transmission line.

Thus, the wind turbine being dismantled comprises a tower with a nacelle and rotor mounted thereon, and placed on a foundation on the site of the wind turbine. At least the rotor comprising the blades of the wind turbine is dismantled and removed. This could for example be due to wear or damage on the blades or due to insufficient energy output from the wind turbine. The method further comprises connecting an airborne wind energy system to a part of the wind turbine via a cable. For example to the wind turbine tower, to the bed frame of the nacelle, to the wind turbine foundation, or the like. Accordingly, the airborne wind energy system is mechanically attached to the wind turbine by means of the cable. Additionally, the airborne wind energy system is electrically connected to a power grid via a power transmission line. Thus, the airborne wind energy system generates electrical energy for a power grid by converting the energy of the wind into electrical energy, essentially in the manner described above.

An "airborne wind energy system" is herein defined as a system comprising a ground station and a part which is launched to a higher altitude than the ground station and being capable of capturing wind energy. The ground station and the part which is launched to a higher altitude are connected by a cable. The harvested energy is transferred to a ground station, either in the form of mechanical energy or in the form of electrical energy. The ground station does not have to be on ground, but rather closer to ground than the part being launched to a higher altitude.

In this manner the erected wind energy generating system according to the invention comprises at least a part of an earlier wind turbine in addition to an airborne wind energy system mounted to the wind turbine tower via a cable. In this way the airborne wind energy system has been retrofitted to a wind turbine of which at least the rotor has been removed.

Hereby a new site for installing the airborne wind energy system is not required. Instead, the site which was already allocated for the wind turbine is reused for accommodating the airborne wind energy system. In this way an energy production is maintained on the site and for the power grid after the wind turbine has been taken out of production. Furthermore the energy production by the airborne wind energy system can be established relatively fast and at relatively low cost by using the already existing wind turbine site.

Hereby, at least the foundation of the earlier wind turbine is advantageously re-used. As a wind turbine tower and the foundation for grounding the tower are typically and in general dimensioned to withstand larger loads and vibrations than occurring for an airborne wind energy system, the wind turbine tower and foundation can in general be re-used directly for the airborne wind energy system without any significant modifications or alterations needed. This may in some situations further lead to that any regulatory or safety approvals for the new use of the tower can be obtained relatively easy and fast.

Advantageously, only the rotor of the earlier wind turbine is removed. Hereby the dismantling and removal of parts of the earlier wind turbine is reduced to a minimum whereby the airborne energy system can be mounted and ready for operation relatively fast and at relatively low costs. Further, this opens for the possibility to re-use parts of the wind turbine in the wind energy generating system for example for mechanically connecting or carrying the airborne wind energy system and/or for converting or otherwise treating the energy output from the airborne wind energy system before being guided to the power grid. This could include re-using for example one or more parts of the nacelle, the bed plate or main frame, the wind turbine converter, the control system, the yaw system, different electrical components, the main shaft and the gear box of the wind turbine.

In an embodiment, the step of mounting the airborne wind energy system is performed by mechanically connecting the cable to a main shaft of the wind turbine. Thus, according to this embodiment, the energy which is transferred from the part of the airborne wind energy system which is launched to a high altitude is in the form of mechanical energy. This mechanical energy is provided to the main shaft of the wind turbine, and is thereby supplied to the generator of the wind turbine, which parts are thereby advantageously re-used.

In a further embodiment of the invention, the method further comprises removing at least the nacelle from the wind turbine and mounting the airborne wind energy system on at least a part of the wind turbine tower.

In general, the reuse of at least a part of or the entire wind turbine tower (with or without parts of the wind turbine nacelle) is especially advantageous in that the airborne wind energy system hereby can be launched and operated from a considerable height. A conventional wind turbine tower is often in the order of 80-120 meter or even higher for more modern wind turbine types, and so even if one or more tower sections are dismantled, a considerable height for operating the airborne wind energy system is realized. In this way, when one end of the cable is mounted on the tower, the length of the cable required in order to position the launched part of the airborne wind energy system at a suitable altitude is considerably reduced as compared to a situation where the cable is attached at a position at or near the ground. This reduces the weight as well as the costs of the cable, in particular in the case that the cable needs to be electrically conductive as well as mechanically durable, because such cables are heavy as well as expensive.

Also, mounting one end of the cable on the wind turbine tower or nacelle allows improved launching and landing/retraction conditions for the airborne wind energy system. For instance, the airborne wind energy system will be clear of any surrounding obstacles such as trees, buildings etc. faster, thereby reducing the risk of collisions between the airborne wind energy system and any surrounding objects. In this way the wind turbine tower provides for a more safe launching and landing place for the airborne wind energy system.

The cable may be electrically conductive. In this case the cable may be configured for transmitting power in the form of AC current or DC current and/or for transmitting communication signals. As an alternative, the cable may merely be configured for mechanically attaching the airborne wind energy system to the wind turbine, but is not used for transmitting current. In this case the cable may, e.g., be in the form of a rope, a wire or the like. The cable may be made at least partly from a durable material, e.g. a synthetic fibre material, such as Kevlar®. In this case the cable may, e.g., be capable of handling expected tensile loads from the airborne wind energy system. For instance, the cable may comprise an electrically conductive core enclosed by a synthetic fibre material, thereby providing a cable which is electrically conductive as well as durable. Furthermore, the wind energy generating system according to the invention is advantageous in re-using at least some infrastructure of the wind turbine in particular the foundation and power lines connecting the site to the power grid. This could further include, e.g. roads, service equipment etc.

In an embodiment, the method further comprises removing at least the nacelle and the tower from the wind turbine and mounting the airborne wind energy system on the foundation of the wind turbine tower. Hereby, as mentioned above, the foundation which is dimensioned to support a wind turbine and thereby with certainty capable of withstanding the loads from an airborne wind energy system is advantageously re-used. The wind turbine foundation thereby need not be removed. In addition, the infrastructure and surroundings already prepared for a wind energy system are advantageously re-used. In particular, the connections to the power grid are already in place for each wind turbine site and the connecting of the airborne wind energy system to the power grid can be established fast and at low costs. Furthermore, it is ensured that the surroundings are cleared or kept clear with no obstacles for the airborne wind energy system, and the infrastructure is in place for servicing or repair.

According to an embodiment of the invention the step of mounting the airborne wind energy system is performed by mounting a platform carrying the airborne wind energy system on a wind turbine yaw bearing. Hereby the airborne wind energy system is mounted on the wind turbine via the yaw bearing of the wind turbine. Thus, the airborne wind energy system re-uses and is retrofitted onto the yawing system of the earlier wind turbine, which can be continued to be used to orient the wind energy generating system relative to the incoming wind and thereby direct the airborne wind energy system into the wind. This could, e.g., be obtained by mounting the cable on some sort of platform mounted onto the yaw bearing, the cable, and thereby the airborne wind energy system, thereby being rotated along with the platform as it performs yawing movements. Hereby the risk of severe cable damage is reduced as the cable will automatically be directed from the platform in an optimal or near optimal angle relative to the wind.

The platform may be any kind of structure suitable for connecting the cable of the airborne wind energy system to and optionally for carrying the airborne part of the airborne wind energy system when not in operation.

In an embodiment, the method according to the invention further comprises the step of removing at least one tower section of the wind turbine tower. Further, the step of mounting an airborne wind energy system is performed by mounting a platform carrying the airborne wind energy system on a tower flange. Hereby only a part of the wind turbine tower or some of the tower sections are re-used for the airborne wind energy system. In this way it is ensured that the remaining tower can withstand higher loads and be less sensible to vibrations from the airborne wind energy system than the original wind turbine tower of greater height. Further, the complexity of and time needed for the mounting of the airborne wind energy system is thereby reduced. The tower flange advantageously provides for a suitable means for coupling and mounting the platform using e.g. the bolt shafts or threaded openings of the tower flange.

In an embodiment, the method further comprises the step of electrically connecting the airborne wind energy system to a power transmission line previously used for electrically connecting the wind turbine to the power grid. According to this embodiment, the electrical energy produced by the airborne wind energy system is supplied to the power grid via the power transmission line of the wind turbine, thereby re-using the power transmission line already in place and functioning of the wind turbine. Thereby no new power transmission line need to be established in order for the airborne wind energy system to generate power for the power grid whereby the airborne wind energy system can be brought into production considerably faster and at considerably lower costs.

The airborne wind energy system may comprise at least one airborne generator, i.e. the airborne generator is included in the part of the airborne wind energy system which is launched to a high altitude. Accordingly, the energy harvested from the wind by the airborne wind energy system is converted into electrical energy at the high altitude, and is transferred towards the ground in the form of electrical energy. An electrically conductive connection is therefore required between the airborne part of the airborne wind energy system and the power transmission line. For instance, the cable may be made from an electrically conductive material. As an alternative, a separate electrically conductive cable may be provided.

As an alternative, the airborne wind energy system may comprise at least one generator positioned on the wind turbine tower. According to this embodiment, the energy harvested from the wind by the airborne wind energy system is transferred towards the ground in the form of mechanical energy and supplied to a generator arranged on the tower of the wind turbine. As another alternative, the separate generator of the airborne wind energy system may be positioned in any other suitable position, such as inside or near the tower of the wind turbine and/or in or near the foundation.

In an embodiment, the step of connecting the airborne wind energy system to the power transmission line comprises electrically connecting the airborne wind energy system to a transformer of the wind turbine. According to this embodiment, the electrical energy originating from the airborne wind energy system is provided to the power transmission line of the wind turbine via the transformer of the wind turbine. Thereby a new transformer is not required for the airborne wind energy system and the transformer of the wind turbine can be re-used. This reduces the costs of the installation.

In an embodiment, the airborne wind energy system is mounted on the wind turbine tower via a mounting base being rotatably connected to a part of the wind turbine. According to this embodiment, the mounting base, and thereby the airborne wind energy system, is allowed to perform small rotational movements relative to the tower and optionally in addition to the movements of the wind turbine yaw system. Thus, even though the airborne wind energy system is substantially directed into the incoming wind for example by means of the yawing system of the wind turbine, it may still be moved slightly away from this position by allowing the mounting base to rotate slightly. This is, e.g., an advantage in the case that the airborne wind energy system is of a kind which comprises a kite, a glider or a similar device, which follows a crosswind flight path, e.g. in 'eight' shapes, while generating electrical energy.

As an alternative, the cable may be mounted directly on the wind turbine tower or directly on the yaw bearing or nacelle.

In an embodiment, the method further comprises a step of positioning at least a part of the airborne wind energy system inside the wind turbine tower and/or inside the nacelle of the wind turbine if not dismantled. The part of the airborne wind energy system may e.g. be positioned inside the wind turbine tower and/or inside the nacelle of the wind turbine when not in operation. Hereby, the wind turbine tower and the nacelle may further be used as a garage for the airborne wind energy system, yielding some protection to the system from the weather and thereby reducing the wear on the system. The part of the airborne wind energy system to be positioned completely or in part inside the tower or nacelle when not in operation may for example comprise the airborne part of the system i.e. the kite, glider or similar device and optionally the cable. In an embodiment the entire airborne wind energy system is positioned within the wind turbine tower walls for example on a platform inside the tower.

According to a second aspect the invention provides a wind energy generating system comprising at least part of a wind turbine on a foundation on a wind turbine site and an airborne wind energy system for generating electrical energy for a power grid, the airborne wind energy system being coupled to the part of the wind turbine via a cable and a wind turbine yaw bearing being operated by a motor, the airborne wind energy system further being electrically connected to the power grid via a power transmission line. Hereby the wind energy generating system comprises an airborne wind energy system coupled to and retrofitted to a part of an earlier wind turbine. Or in other words, coupled to the part remaining from an earlier wind turbine of which at least the rotor has been dismantled or otherwise removed. The advantages hereof are as described in relation to the method described in the above.

In an embodiment, the airborne wind energy system is coupled to at least a part of the wind turbine tower via a platform.

The airborne wind energy system is coupled to the part of the wind turbine via a wind turbine yaw bearing being operated by a motor. The wind energy generating system may further comprise a control system for controlling the motor. By controlling the motor, the yaw bearing may be operated completely or in part as on the earlier wind turbine to perform yawing movements and thereby rotating the attachment point of the cable in accordance with the direction of the wind. The attachment point could be an the nacelle or anywhere above or on the yaw bearing such that the attachment point can rotate relative to the tower.

In an embodiment, the airborne wind energy system is electrically connected to a power transmission line previously used for electrically connecting the wind turbine to the power grid.

In an embodiment, the airborne wind energy system is electrically connected to the power transmission line via a wind turbine transformer.

In an embodiment, the airborne wind energy system comprises at least one airborne generator.

In an embodiment, the airborne wind energy system comprises at least one generator positioned at or near the wind turbine tower.

In one embodiment, the wind energy generating system may comprise a control structure configured to control movement of a part of the airborne wind energy system which is launched to a higher altitude.

It should be understood, that the above described control system for controlling the motor and the control structure for controlling movement of the airborne wind energy system may be two separate systems. However, in one embodiment, one of the control structure and the control system may be a subsystem of the other one of the control structure and the control system. The control structure and the control system may further be integrated in the same computer system. The control structure and the control system may be operated independent of each other.

In one embodiment, the control structure may be configured to execute a predetermined movement pattern effecting rotational movement of the airborne wind energy system, i.e. a 360 degrees movement. The rotational movement may be uniform meaning that is identical to the previous rotation or it may be non-uniform; i.e. that each rotation may follow another path than the previous rotation. The rotation may e.g. circular, oval, wave-shaped, etc., while still forming a rotational movement.

In one embodiment, the rotational movement may be substantially circular.

BRIEF DESCRIPTION OF THE DRAWINGS

The invention will now be described in further detail with reference to the accompanying drawings in which.

DETAILED DESCRIPTION OF THE DRAWINGS

Figure 1:
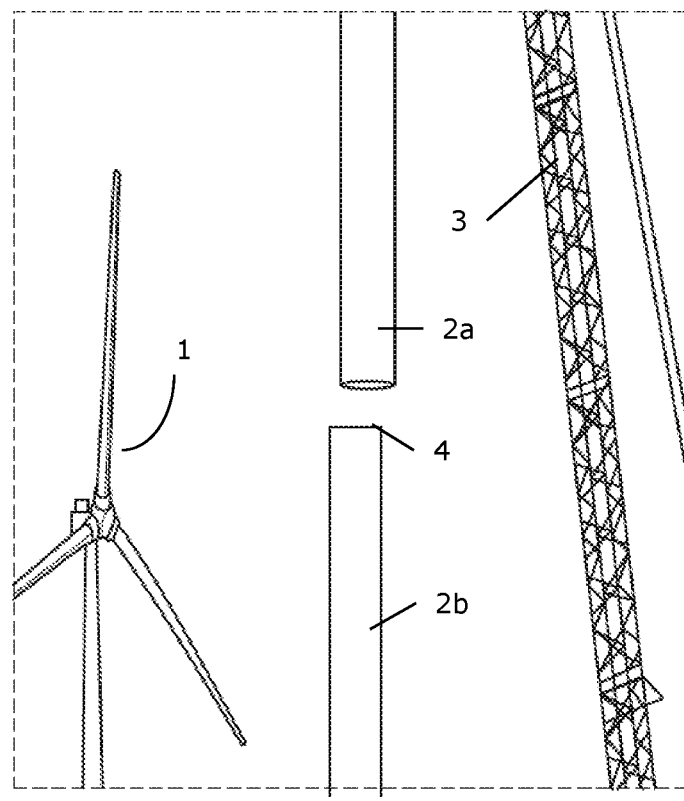
FIG. 1 is a sketch of a wind turbine being dismantled.

FIG. 1 illustrates the partial dismantling of a wind turbine 1 in preparation of the re-use of the wind turbine tower for the retrofitting of an airborne wind energy system. Here, the nacelle (not shown) has already been removed and a first tower section 2a is being removed from a wind turbine (suspended from a crane 3), leaving in place a second or more tower sections 2b placed on a foundation on the wind turbine site. The remaining one or more tower sections 2b thereby end in a tower flange 4 which may advantageously be used for the mounting of an airborne wind energy system. Alternatively, only the rotor of the wind turbine may be dismantled and the airborne wind energy system retrofitted to the remaining parts of the wind turbine.

Figure 2:
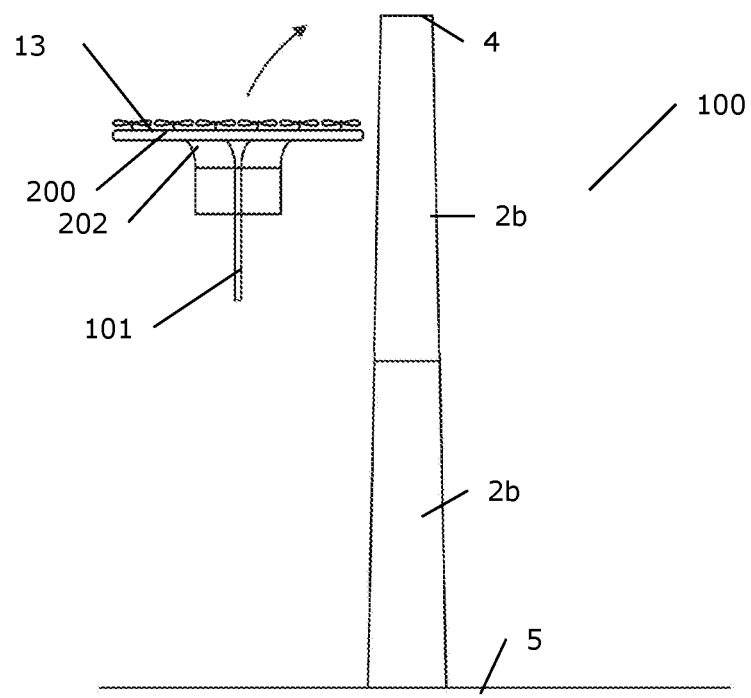
FIG. 2 is a sketch of the retrofit of an airborne wind energy system to a wind turbine tower according to embodiments of the invention.

FIG. 2 illustrates the method for dismantling a wind turbine 1 and erecting a wind energy generating system 100 according to the invention. The wind energy generating system comprises at least a part of a wind turbine tower 2b placed on a foundation 5 on a wind turbine site and an airborne wind energy system 200 for generating electrical energy for a power grid which is mounted on the tower 2b or another part of the remaining wind turbine. The airborne wind energy system 200 is electrically connected to the power grid via a power transmission line 201. The power transmission line may be coupled to a transformer of the wind turbine, or to the power transmission line of the wind turbine (previously used for electrically connecting the wind turbine to the power grid), or may be separate therefrom. In this way at least the wind turbine foundation 5 and one or more of the wind turbine tower sections 2b have been reused in the erected wind energy generating system 100 comprising the airborne wind energy system 200. Further parts from the wind turbine may be re-used and form part of the erected wind energy generating system 100 such as the nacelle, the main frame, the main shaft, the yaw bearing, the converter, the transformer, and/or the power transmission line of the wind turbine.

In FIG. 2 is illustrated the mounting of a platform 202 carrying the airborne wind energy system 200 onto the wind turbine tower 2b. The platform may be mounted for example onto the wind turbine yaw bearing (not shown), onto the main frame of the wind turbine nacelle (not shown), or on a tower flange 4.

In FIG. 2 the airborne wind energy system 200 for generating electrical energy is sketched as comprising a glider 13, also sometimes referred to as a Makani. This will be described in more detail later. The airborne wind energy system 200 for generating electrical energy could likewise comprise a kite as described in relation to the following figure. In all embodiments the airborne wind energy system 200 is mechanically and for some types of airborne wind energy systems also electrically coupled to the wind turbine tower via a cable 6 (see later figures).

Figure 3:
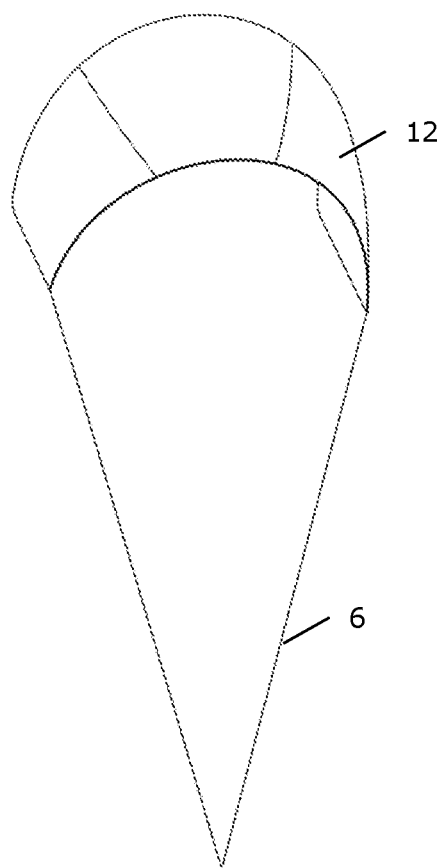
FIGS. 3 and 4 are perspective views of two airborne wind energy systems for use in a wind energy generating system according to an embodiment of the invention.

FIG. 3 is a perspective view of an airborne wind energy system in the form of a kite 12, for use in a wind energy generating system comprising according to an embodiment of the invention. The kite 12 catches the wind and is thereby moved. This causes a cable 6 attached to the kite 12 to be extracted or retrieved, thereby generating mechanical energy. This mechanical energy is transferred to a generator positioned on the ground station which may be positioned at the top of the remaining wind turbine tower or on the ground, which then is in turn electrically coupled to a power transmission line and to the power grid optionally via the wind turbine converter and/or transformer.

Figure 4:
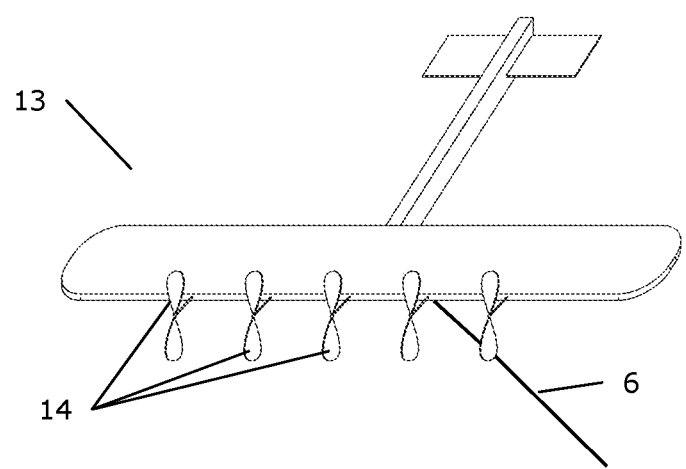

FIG. 4 is a perspective view of an alternative airborne wind energy system in the form of a glider 13, also sometimes referred to as a Makani, for use in a wind energy generating system according to an embodiment of the invention. The glider 13 is provided with a number of rotors 14, each being capable of extracting energy from the wind and generating electrical energy. The generated electrical energy is transferred from the glider by means of an electrically conducting cable 6. The cable 6 may be electrically connected to a transformer positioned on a ground station or near the wind turbine tower which is in turn electrically coupled to a power transmission line and to the power grid optionally via the wind turbine converter and/or transformer.

Figure 5:
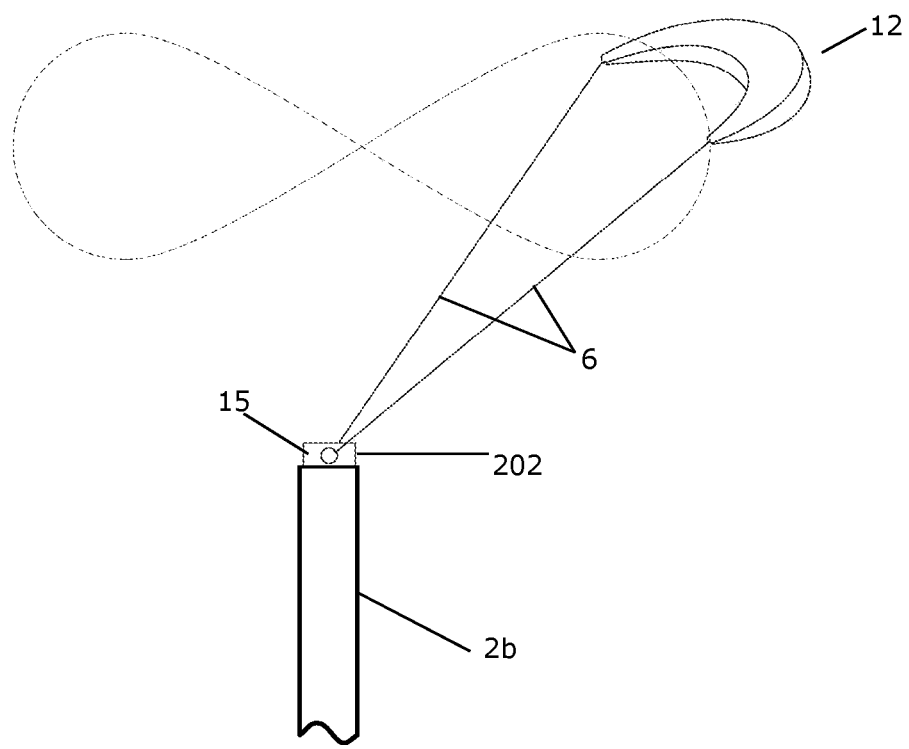
FIGS. 5 and 6 illustrate airborne wind energy generating systems according to two embodiments of the invention.

FIG. 5 illustrates operation of the kite 12 of FIG. 3. It can be seen that the wind acts on the kite 12 and causes it to move along a movement pattern. For instance, the kite 12 may be extracted along a substantially linear path and subsequently retracted while moving along a movement pattern having the shape of the figure eight, as indicated by the dotted line. During the linear movement of the kite 12, mechanical energy may be transferred to an element arranged at the attachment point of the ground station 15 on the platform 202, thereby causing electrical energy to be generated, e.g. in the manner described above with reference to FIGS. 2-3. During the subsequent retraction of the kite 12, energy may be consumed. However, the energy consumed is expected to be less than the energy being generated during the linear movement of the kite 12. The kite 12 is hereby mechanically connected to the platform and to the tower 2b of the wind turbine and thereby advantageously launched from and retracted to a height considerably above the level of the ground.

Figure 6:
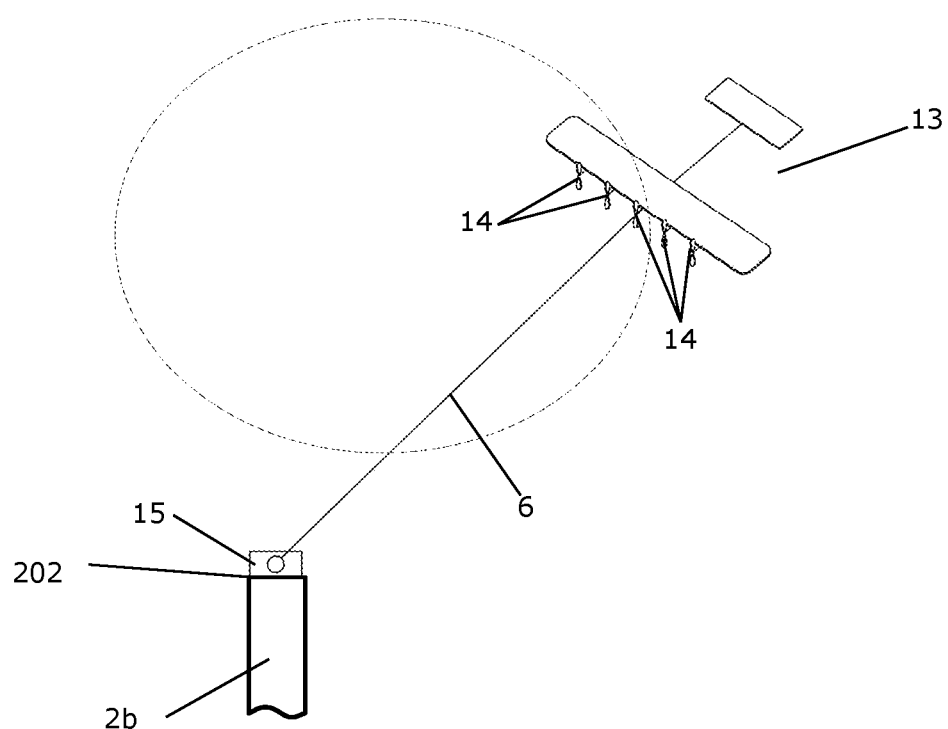

FIG. 6 illustrates operation of the glider 13 of FIG. 4. It can be seen that the wind acts on the glider 13 and causes it to move along a substantially circular movement pattern, as indicated by the dotted line. This movement of the glider 13 causes rotation of the rotors 14, and thereby electrical energy is generated. The electrical energy is transferred to a suitable electrical component, e.g. a transformer or a converter unit, arranged at the attachment point of the ground station 15 on the platform 202 via electrically conductive cable 6. As for the kite of FIG. 5, the glider 13 is hereby mechanically connected to the platform 202 and to the tower 2b of the wind turbine and thereby advantageously launched from and retracted to a height considerably above the level of the ground.

In alternative embodiments, the airborne wind energy system is connected to the foundation of the wind turbine and the wind turbine tower has been dismantled.

Figure 7:
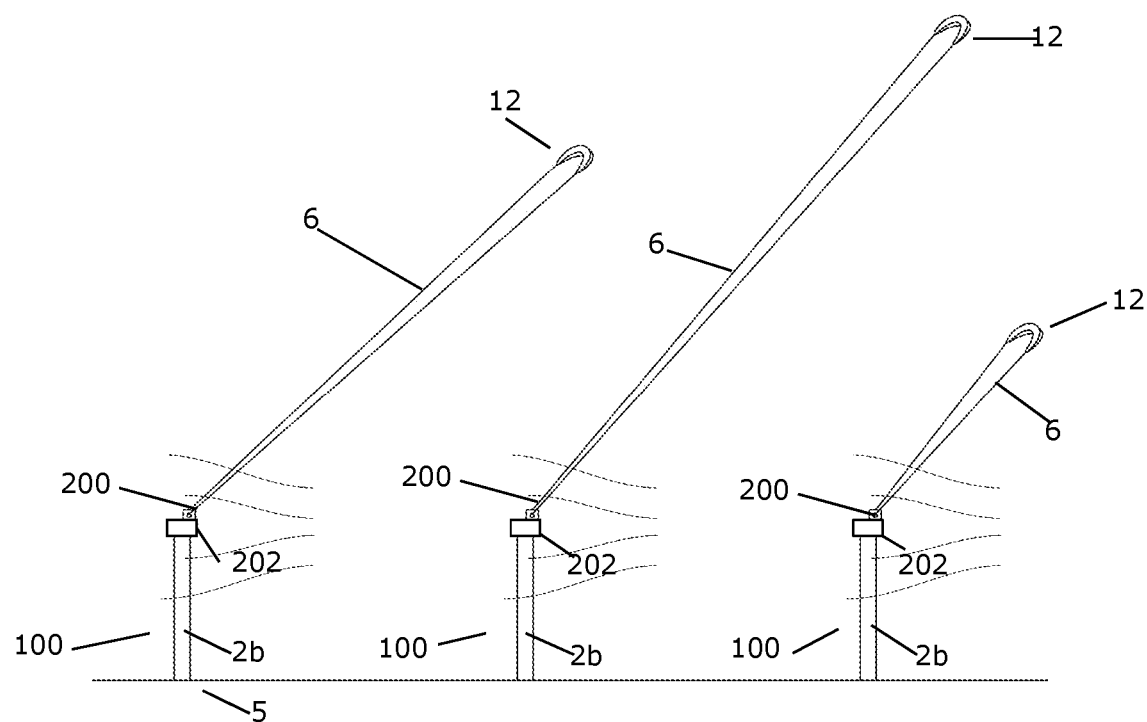
FIGS. 7 and 8 illustrate operation of wind energy generating systems according to embodiments of the invention.

FIG. 7 illustrates operation of wind energy generating systems 100 according to an embodiment of the invention. A number of wind energy generating systems 100 are shown in FIG. 7, each comprising a wind turbine tower 2b of one or more tower sections placed on a wind turbine foundation 5 on a wind turbine site. The nacelle of each wind turbine has been dismantled and an airborne wind energy system 200 in the form of a kite 12 has been retrofitted to the wind turbine tower 2b. In the embodiment where the airborne wind energy system 200 has been mounted to the wind turbine yaw bearing, the kites 12 rotate along in accordance with the direction of the wind similarly to the earlier wind turbine nacelle would have done, and perform yawing movements relative to the respective towers 2b. Thereby it is ensured that the kites 12 are launched directly into the wind. This reduces the wear of the cable 6 and reduces the risk of cable breakage.

Because the airborne wind energy systems are mounted on top of at least a part of a wind turbine tower, the kites 12 are launched to a desirable high altitude with considerably less use of cable and in a considerable shorter time.

The kites 12 are able to move along specified movement paths, e.g. as described above with reference to FIG. 5. Thereby mechanical energy is generated and transferred to the respective generators positioned on the respective wind turbine towers 2b. It can also be seen that the kites 12 are in different positions along their movement patterns. Thus, the kites 12 need not to operate in a synchronous manner.

Figure 8:
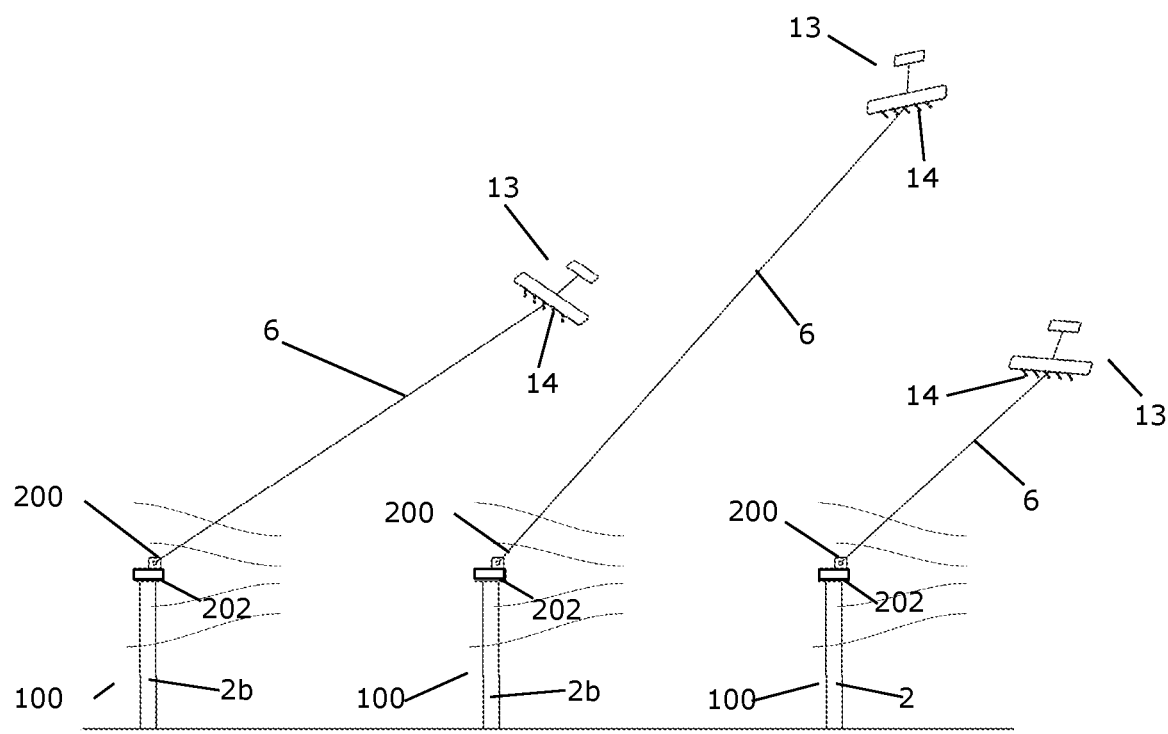

FIG. 8 illustrates operation of wind energy generating systems 100 according to an embodiment of the invention. The system is analogous to the one described in relation to FIG. 7, only here the airborne wind energy systems 200 are in the form of gliders 13. The gliders 13 are able to move along specified movement paths, e.g. as described above with reference to FIG. 6. Thereby the rotors 14 of the gliders 13 generate electrical energy, and the generated electrical energy is transferred to the ground stations on the respective wind turbine towers 2b via electrically conducting cables 6. Here the electrical energy is supplied to a transformer or a converter unit, e.g. in the manner described above with reference to FIG. 6.

In an embodiment, an assembly or park of more wind turbine towers is equipped with different types of airborne wind energy systems such as for example a kite on a wind turbine tower next to a wind turbine tower with a glider.

Figure 9:
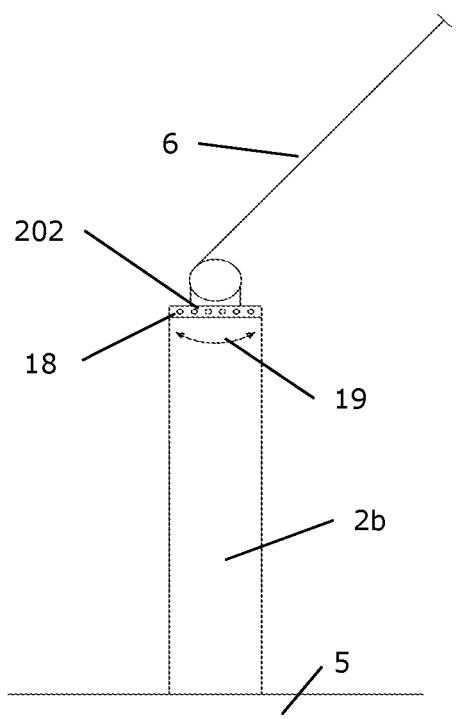
FIG. 9 illustrates mounting of an airborne wind energy system on a platform mounted on a wind turbine yaw bearing.

FIG. 9 illustrates mounting of an airborne wind energy system 200 on a platform 202 positioned on a wind turbine yaw bearing 18. The wind energy generating system hereby comprises the wind turbine tower 2b placed on a foundation 5 on a wind turbine site and the airborne wind energy system 200 being coupled to the wind turbine tower 2b via a cable 6 and via a wind turbine yaw bearing 18. The airborne wind energy system 200 is further electrically connected to the power grid via a power transmission line (not shown). In this way the yaw bearing 18 of the earlier wind turbine is re-used for the new wind energy generating system 100. The yaw bearing may be operated completely or in part as on the earlier wind turbine to perform yawing movements and thereby rotating the platform 202 in accordance with the direction of the wind as illustrated by the arrow 19. In this way the attachment point 15 for the cable 6 of the airborne wind energy system is automatically oriented so that the cable is oriented in the same or nearly the same direction from the platform during operation of the kite or the glider.

Figure 10:
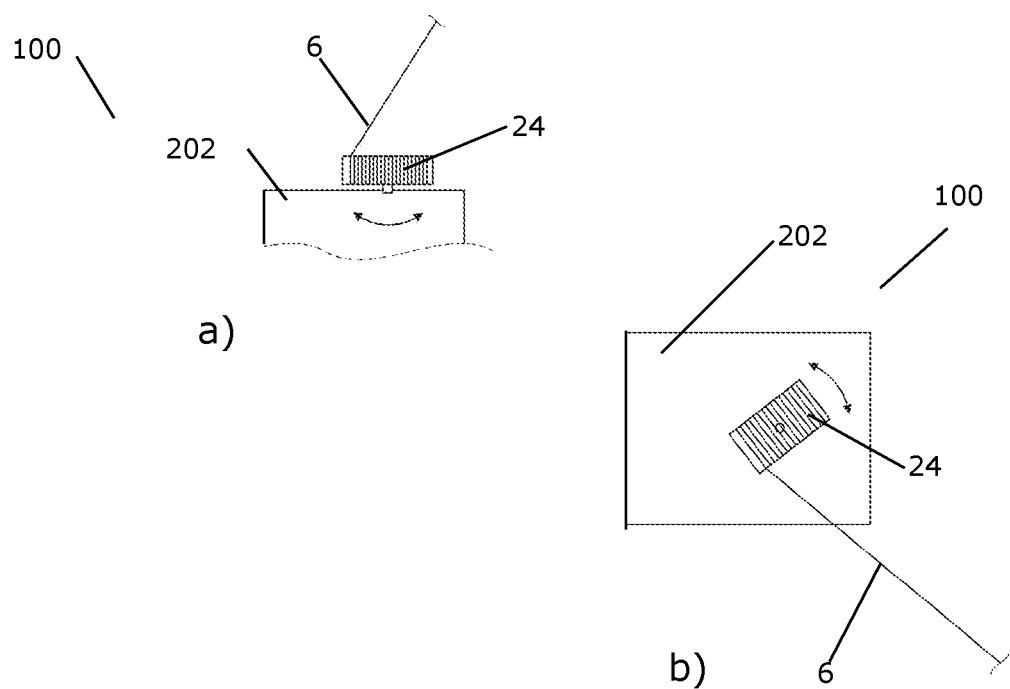
FIG. 10 illustrates mounting of an airborne wind energy system on a wind turbine tower according to an embodiment of the invention.

FIG. 10 illustrates mounting of an airborne wind energy system 200 on a platform 202 on a wind turbine tower according to an embodiment of the invention. FIG. 10a is a side view of the wind energy generating system 100 and FIG. 10b is a top view of the wind energy generating system 100. The airborne wind energy system 200 is mounted on the platform 202 on the wind turbine tower, via a cable 6. Thereby, if the platform is mounted on the wind turbine yaw bearing, the airborne wind energy system is in general rotated along with the platform 3, as it performs yawing movements causes by the yawing system. However, the cable 6 is attached to a mounting base 24 being rotatably connected to the platform 202. Accordingly, the attachment point of the cable 6 is allowed to rotate slightly relative to the platform 202. This may, e.g., be advantageous when the airborne wind energy system moves along a movement pattern, e.g. as described above with reference to FIGS. 5 and 6. In an embodiment, the platform may be formed by the entire or a part of the wind turbine nacelle.

Figure 11:
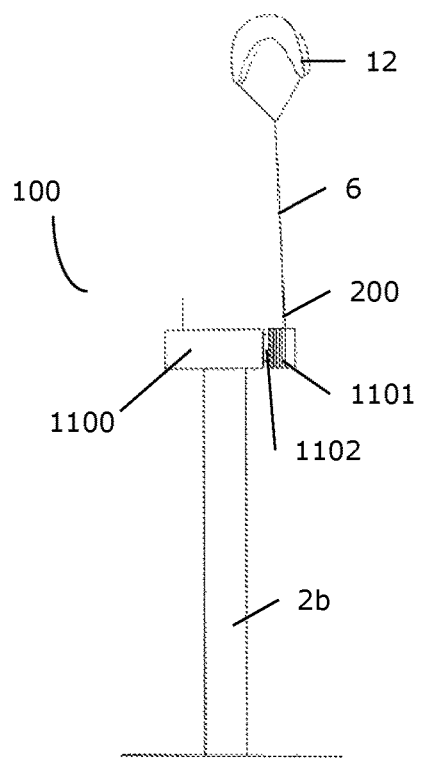
FIG. 11-13 illustrate another embodiment of mounting an airborne wind energy system on a nacelle of a wind turbine.
Figure 12:
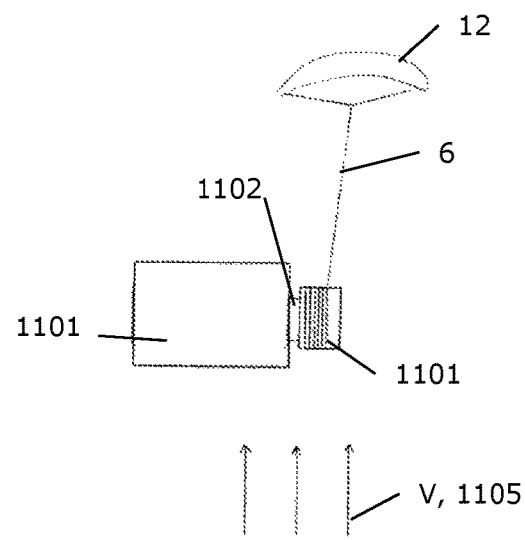
Figure 13:
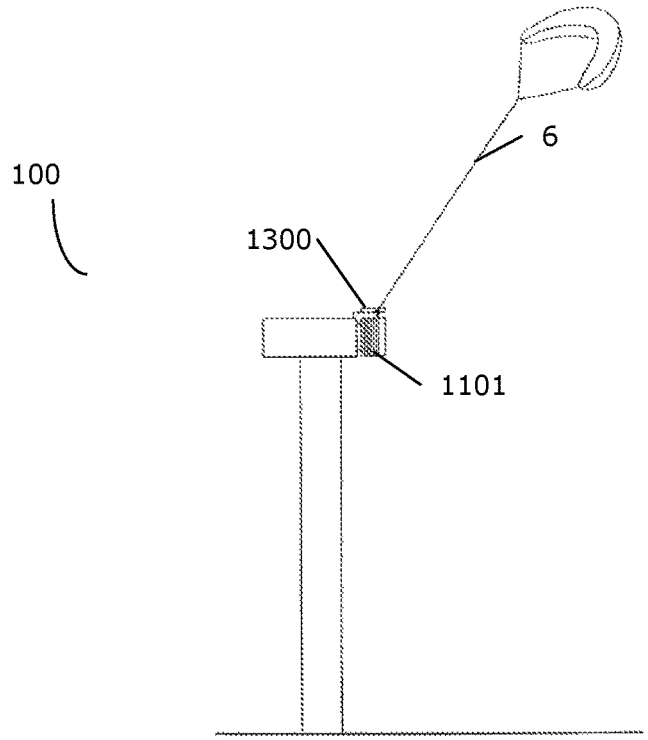

FIGS. 11-13 illustrate another embodiment of mounting an airborne wind energy system 200 on a nacelle 1100 of a wind turbine. FIGS. 10 and 13 are side views of the wind energy generating system 100 and FIG. 12 is a top view of the wind energy generating system 100 of FIG. 11 The airborne wind energy system 200 is mechanically connected to the main shaft 1102 of the wind turbine via the cable 6 being wound and unwound of a wire drum 1101. During operation, the kite 12 is extracted along a substantially linear path and subsequently retracted while moving along a movement pattern having the shape of the figure eight, as indicated in FIG. 5. During the extraction of the cable, mechanical energy is then transferred to the wire drum 1101 and thereby to the wind turbine main shaft 1101 generating energy. In FIGS. 11 and 12 are illustrated that the nacelle 1100 is yawed relative to the direction of the wind V, 1105, such that the wind direction is generally transverse (preferably at approximately 90 degrees) to the axial direction of the nacelle and the main shaft. Hereby, the wear on the cable 6 is reduced. Alternatively, or additionally, the wire drum 1101 comprises a guide member 1300 for guiding the wire relative to the drum axis such as to reduce wear on the cable 6. In this way, the nacelle need not by yawed relative to the wind direction.

Figure 14:
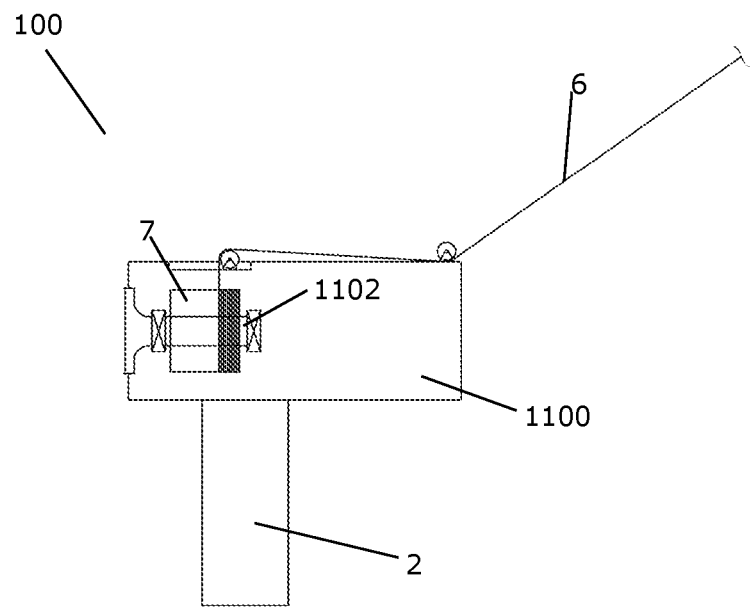
FIGS. 14-16 illustrate wind energy generating systems according to three embodiments of the invention.

FIG. 14 illustrates a further embodiment of a wind energy generating system 100 according to the invention. Here, the wind turbine rotor has been dismantled. The rotor was connected to a main shaft 1102 and the rotating movements of the rotor thereby transferred to the main shaft 1102. The main shaft 1102 is coupled to a generator (not shown) via a gear system (not shown). Thereby rotating movements of the main shaft 5 are transformed into electrical energy by means of the generator. In this embodiment, the airborne wind energy system (not shown) is coupled to the nacelle 1100 of the wind turbine 1 via a cable 6. Thereby the airborne wind energy system also re-uses the yawing system of the previous wind turbine. The cable 6 is mechanically coupled to the main shaft 1102 by the cable 6 being wound around an element 7 being arranged around the main shaft 1102. Thereby extracting or retrieving the cable 6 causes the element 7 to rotate. This rotation can be transferred to the main shaft 1102 for energy production by the generator. The energy generated by the airborne wind energy system is, according to this embodiment, transferred to the wind energy generating system 100 in the form of mechanical energy.

Figure 15:
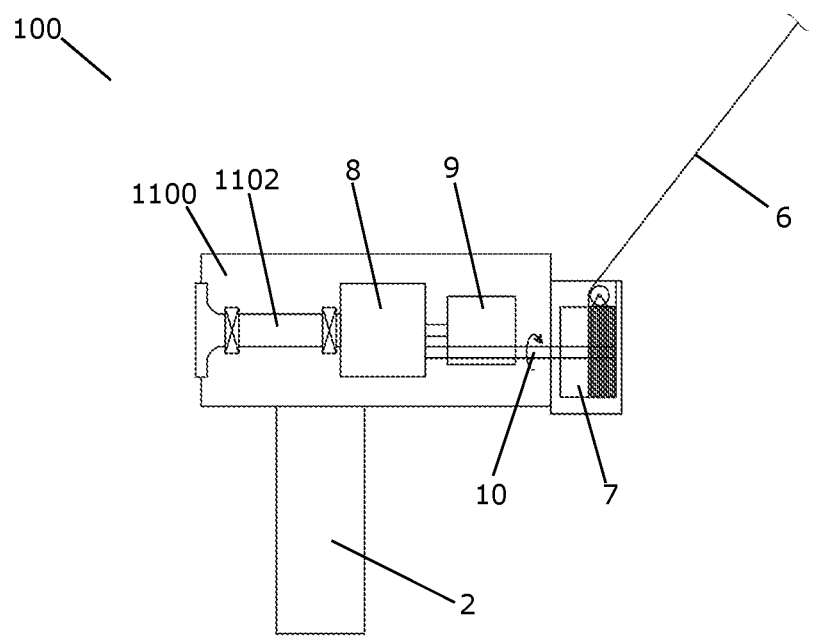

FIG. 15 illustrates a wind energy generating system 100 according to a further embodiment of the invention. In this embodiment, the cable 6 is wound around an element 7 which is coupled to the wind turbine gear system 8 via a rotating shaft 10. Thereby rotational movements of the element 7, caused by extracting or retrieving the cable 6, are transferred to the gear system 8, thereby increasing the rotational speed of the input shaft of the generator 9. Accordingly, the energy production of the generator 9 is increased, similar to the situation described above with reference to FIG. 14. Accordingly, in the embodiment of FIG. 15 the energy generated by the airborne wind energy system is also transferred to the wind energy generating system 100 in the form of mechanical energy, and the wind energy generating system re-uses several parts of the earlier wind turbine including the gear system and generator in addition to the nacelle, the wind turbine tower and the foundation.

Figure 16:
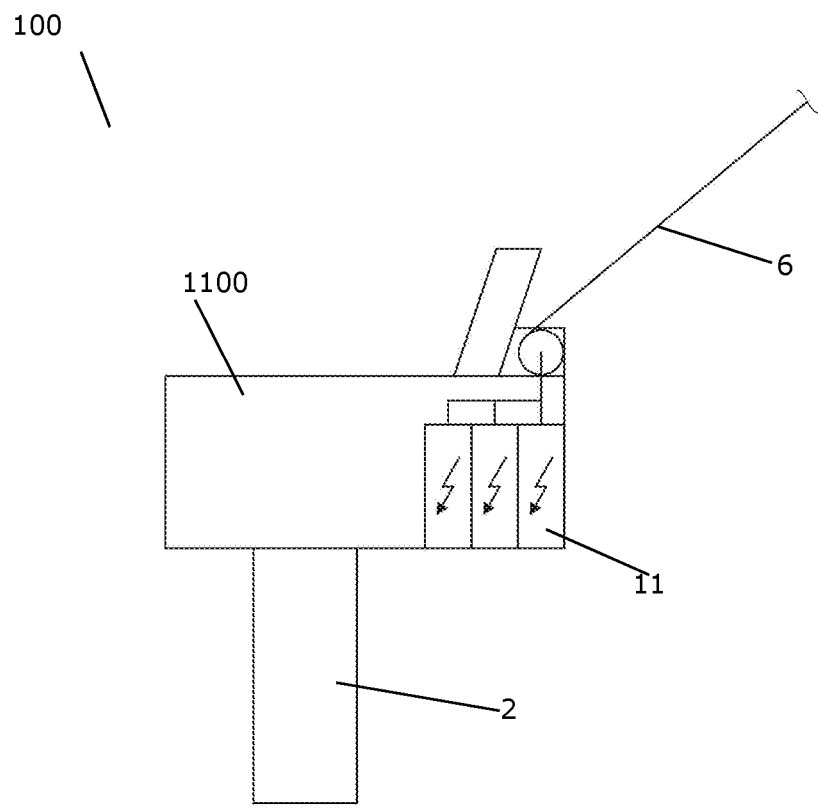

FIG. 16 illustrates a wind energy generating system 100 according to yet a further embodiment of the invention. In the embodiment of FIG. 16 the cable 6 is electrically connected to a transformer 11 of the previous wind turbine. The transformer 11 may be connected to the transmission line (not shown) of the earlier wind turbine. Thus, the energy generated by the airborne wind energy system is transferred to the ground station formed by the transformer in the form of electrical energy, and the cable 6 therefore needs to be electrically conducting.

Thus, also in this embodiment, several parts of the previous wind turbine are re-used including the nacelle and the wind turbine transformer and optionally the transmission line in addition to the wind turbine tower and foundation.

The invention claimed is:

1. A method of erecting a wind energy generating system, comprising:
providing a previously used wind turbine comprising a tower placed on a foundation on a wind turbine site and a nacelle with a rotor having blades mounted on the tower,
dismantling the used wind turbine by removing at least the rotor from the wind turbine such that rotation of the rotor blades is no longer used to provide mechanical energy for generating electrical energy for a power grid,
mounting an airborne wind energy system for generating electrical power on a remaining part of the wind turbine via a cable; and
electrically connecting the airborne wind energy system to the power grid via a power transmission line.

2. The method according to claim 1, wherein the step of mounting the airborne wind energy system is performed by mechanically connecting the cable to a main shaft of the wind turbine.

3. The method according to claim 1, further comprising removing at least the nacelle from the wind turbine and mounting the airborne wind energy system on at least a part of the wind turbine tower.

4. The method according to claim 3, wherein the step of mounting the airborne wind energy system is performed by mounting a platform carrying the airborne wind energy system on a wind turbine yaw bearing.

5. The method according to claim 3, further comprising the step of removing at least one tower section of the wind turbine tower, and wherein the step of mounting an airborne wind energy system is performed by mounting a platform carrying the airborne wind energy system on a tower flange.

6. The method according to claim 1, further comprising removing at least the nacelle and the tower from the wind turbine and mounting the airborne wind energy system on the foundation of the wind turbine tower.

7. The method according to claim 1, further comprising the step of electrically connecting the airborne wind energy system to a power transmission line previously used for electrically connecting the wind turbine to the power grid.

8. The method according to claim 7, wherein the step of connecting the airborne wind energy system to the power transmission line comprises electrically connecting the airborne wind energy system to a transformer of the wind turbine.

9. The method according to claim 1, wherein the airborne wind energy system is mounted on the part of the wind turbine via a mounting base being rotatably connected to the wind turbine tower.

10. The method according to claim 1, further comprising a step of positioning at least a part of the airborne wind energy system inside the wind turbine tower and/or inside the nacelle of the wind turbine.

11. The method according to claim 10, wherein the part of the airborne wind energy system is positioned inside the wind turbine tower and/or inside the nacelle of the wind turbine when not in operation.

12. A wind energy generating system comprising:
a previously used wind turbine being partially dismantled wherein a rotor having blades is removed from the wind turbine such that rotation of the blades is no longer used to provide mechanical energy for generating electrical energy for a power grid, the wind turbine on a foundation on a wind turbine site, wherein the wind turbine includes a wind turbine yaw bearing being operated by a motor; and
an airborne wind energy system for generating electrical energy for the power grid, the airborne wind energy system being coupled to the used wind turbine via a cable,
wherein the airborne wind energy system further being electrically connected to the power grid via a power transmission line.

13. The wind energy generating system according to claim 12, further comprising a control system for controlling the motor.

14. The wind energy generating system according to claim 12, wherein the airborne wind energy system is electrically connected to a power transmission line previously used for electrically connecting the wind turbine to the power grid.

15. The wind energy generating system according to claim 12, wherein the airborne wind energy system is electrically connected to the power transmission line via a wind turbine transformer.

16. The wind energy generating system according to claim 12, wherein the airborne wind energy system comprises at least one airborne generator.

17. The wind energy generating system according to claim 12, wherein the airborne wind energy system comprises at least one generator positioned at or near a tower of the wind turbine.

18. The wind energy generating system according to claim 12, further comprising a control structure configured to control movement of a part of the airborne wind energy system which is launched to a higher altitude.

19. The wind energy generating system according to claim 18, wherein the control structure is configured to execute a predetermined movement pattern effecting rotational movement of the airborne wind energy system.

20. The wind energy generating system according to claim 19, wherein the rotational movement is substantially circular.

* * * * *